United States Patent
Worden et al.

(10) Patent No.: US 12,454,295 B2
(45) Date of Patent: *Oct. 28, 2025

(54) VEHICLE CONTROL SYSTEM

(71) Applicant: Transportation IP Holdings, LLC, Norwalk, CT (US)

(72) Inventors: Bret Dwayne Worden, Erie, PA (US); Ajith Kuttannair Kumar, Erie, PA (US); Jingjun Zhang, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/955,764

(22) Filed: Sep. 29, 2022

(65) Prior Publication Data

US 2023/0016710 A1  Jan. 19, 2023

Related U.S. Application Data

(63) Continuation-in-part of application No. 16/533,287, filed on Aug. 6, 2019, now Pat. No. 11,485,393.

(60) Provisional application No. 62/715,859, filed on Aug. 8, 2018.

(51) Int. Cl.
*B61L 27/04* (2006.01)
*B61K 9/12* (2006.01)

(52) U.S. Cl.
CPC .......... *B61L 27/04* (2013.01); *B61K 9/12* (2013.01); *B61L 2201/00* (2013.01)

(58) Field of Classification Search
CPC ........ B61K 9/08; B60W 40/109; B61C 15/08; B61C 15/14
See application file for complete search history.

(56) References Cited

U.S. PATENT DOCUMENTS

| | | | |
|---|---|---|---|
| 6,144,901 A | 11/2000 | Nickles et al. | |
| 6,263,266 B1 | 7/2001 | Hawthorne | |
| 8,424,813 B1 * | 4/2013 | Voelkerding | E01B 7/10 246/468 |
| 8,473,128 B2 | 6/2013 | Oldknow et al. | |
| 9,120,493 B2 * | 9/2015 | Kumar | B61L 15/0058 |
| 9,340,211 B1 * | 5/2016 | Singh | B60T 8/1725 |
| 11,485,393 B2 * | 11/2022 | Worden | B60W 40/109 |
| 2005/0234628 A1 * | 10/2005 | Luders | B60W 40/068 701/80 |
| 2005/0242053 A1 * | 11/2005 | Brabb | F16C 33/20 403/135 |

(Continued)

*Primary Examiner* — Hussein Elchanti
(74) *Attorney, Agent, or Firm* — K&L Gates LLP

(57) ABSTRACT

A system and method for controlling a vehicle system may determine one or more of a route parameter of a route on which the vehicle system is moving or a vehicle parameter of the vehicle system. The system and method may also determine whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route may be reduced to a value less than the designated threshold by changing an operation of the vehicle system.

16 Claims, 7 Drawing Sheets

(56) References Cited

U.S. PATENT DOCUMENTS

| | | | |
|---|---|---|---|
| 2005/0246075 A1* | 11/2005 | Foster | B61L 27/57 |
| | | | 701/19 |
| 2006/0065791 A1* | 3/2006 | McCallum | E01B 3/20 |
| | | | 246/415 R |
| 2009/0095195 A1 | 4/2009 | Kumar et al. | |
| 2009/0125287 A1* | 5/2009 | Hawthorne | G09B 9/04 |
| | | | 703/8 |
| 2010/0023190 A1* | 1/2010 | Kumar | B61L 27/53 |
| | | | 701/20 |
| 2010/0262321 A1* | 10/2010 | Daum | B61L 27/16 |
| | | | 701/19 |
| 2010/0274450 A1* | 10/2010 | Nardi | B60R 21/0132 |
| | | | 701/45 |
| 2017/0043793 A1* | 2/2017 | Evans | B61C 9/14 |
| 2017/0129472 A1* | 5/2017 | Zhu | B61B 13/08 |
| 2020/0047781 A1* | 2/2020 | Worden | B61K 9/08 |
| 2021/0269071 A1* | 9/2021 | Ahuja | B61F 99/00 |
| 2021/0283969 A1* | 9/2021 | Danielson | B60G 17/0165 |

* cited by examiner

VEHICLE CONTROL SYSTEM

CROSS-REFERENCE TO RELATED APPLICATIONS

This application is a continuation-in-part of U.S. patent application Ser. No. 16/533,287, which was filed 6 Aug. 2019, which, in turn, claims priority to U.S. Provisional Application No. 62/715,859, which was filed 8 Aug. 2018, each of which is hereby incorporated by reference in its entirety.

BACKGROUND

Technical Field

Embodiments of the disclosure relate to systems and methods for controlling movement of vehicle systems.

Discussion of Art

Vehicle systems impart various forces on routes traveled upon by the vehicle systems. For example, weight of the vehicle systems imparts a vertical force on the route, while movement around a curve, rotation of wheels, acceleration, and the like, can impart lateral forces on the routes (e.g., forces that are oriented in directions that are closer to, but not necessarily parallel to, the surface of the tracks). Large differences between these forces can pose a risk to continued safe travel of the vehicle systems.

For example, when a locomotive or other rail vehicle system encounters a curved segment of a track, lateral forces exerted on the rail(s) by the wheels of the vehicle system tend to force the wheel to climb the rail or roll over the rail. The lateral forces exerted by the wheels may be affected by parameters of the route, the wheel, or the vehicle system. For example, the parameters may include route irregularities, wheel irregularities, the vehicle position within a consist, axle tractive effort, the axle position within a multi-axle vehicle system, wheel and/or rail profiles, or the like, and may affect the lateral force exerted by one or the wheels of the vehicle system on the route. As the ratio of lateral forces to vertical forces increases, the risk for derailment may increase. It may be desirable to have a system and method that differs from those that are currently available.

BRIEF DESCRIPTION

Embodiments of the disclosure provide a method including determining whether a ratio of a lateral force exerted by one or more wheels of a vehicle system on a route to a vertical force exerted by one or more wheels of the vehicle system on the route increases to a value exceeding a designated threshold.

Embodiments of the disclosure provide a vehicle control system including one or more processors configured to determine whether a ratio of a lateral force exerted by one or more wheels of a vehicle system on a route to a vertical force exerted by the one or more wheels of the vehicle system on the route increases to a value exceeding a designated threshold.

Embodiments of the disclosure provide a method including determining one or both of a route parameter of a route on which a vehicle system is moving, or a vehicle parameter of the vehicle system. In at least one example, the method also may include in response to said determining, reducing a ratio of a lateral force exerted by one or more wheels of a vehicle system on the route to a vertical force exerted by the one or more wheels of the vehicle system on the route to a value less than a designated threshold. In at least one further example, reducing the ratio occurs by changing an operation of the vehicle system.

BRIEF DESCRIPTION OF THE DRAWINGS

The subject matter described herein may be understood from reading the following description of non-limiting embodiments, with reference to the attached drawings, wherein below.

DETAILED DESCRIPTION

Figure 1:
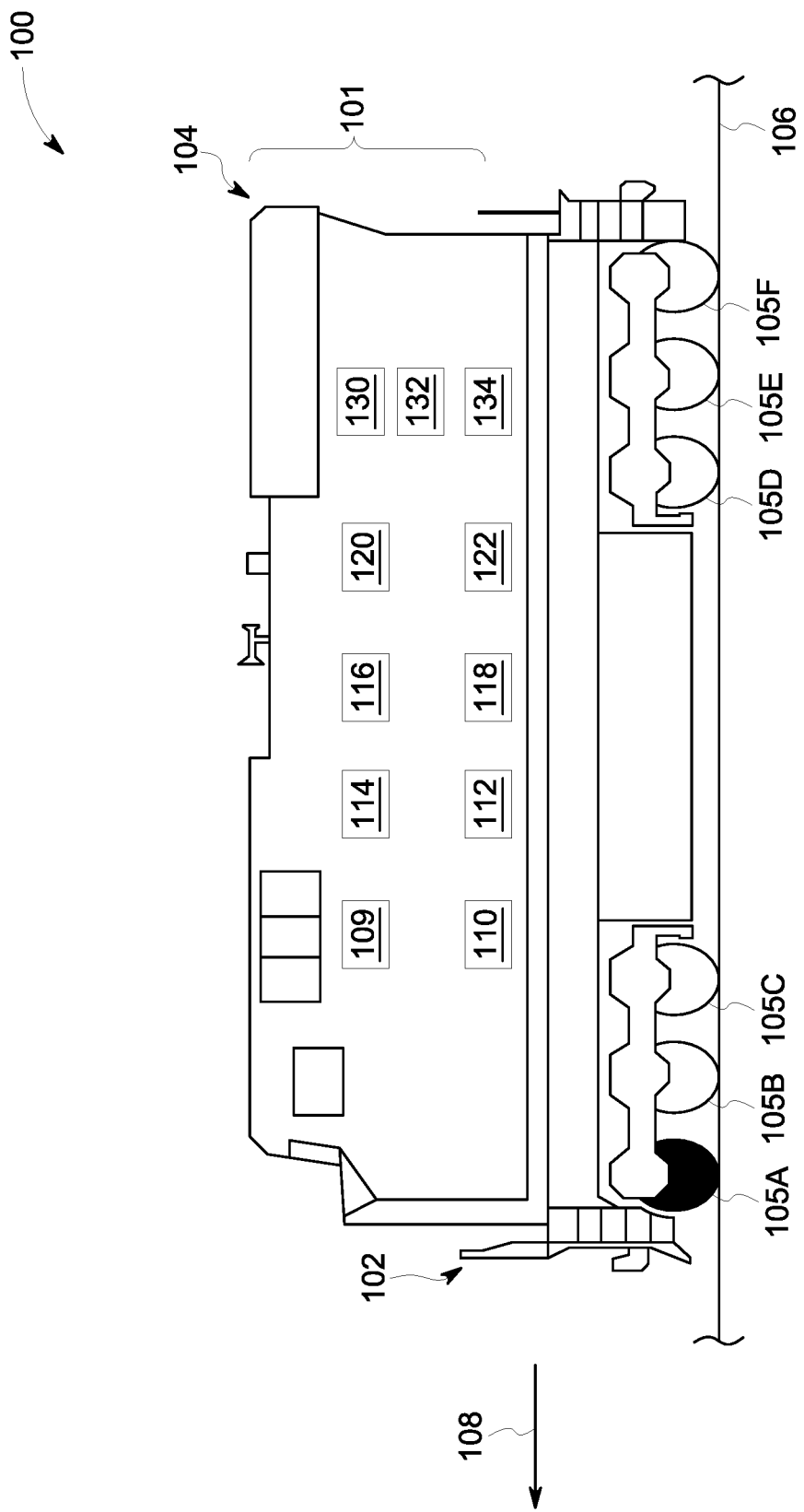
FIG. 1 illustrates one embodiment of a vehicle system.

Embodiments disclosed herein relate to systems and methods for controlling movement of vehicle systems. In one embodiment, a system and method determines route parameters of a route or vehicle parameters of a vehicle system, which may be used to determine lateral forces and vertical forces that are exerted by the wheels of the vehicle system on the route. As one example, the route parameters may include a radius of curvature of a curved section of the route, a cant of the route, a change in a cant of the route, or the like. Additionally, the vehicle parameters may include a wheel defect in a wheel, a wheel diameter, a relative difference in wheel diameters between different wheels of the vehicle system, relative difference of a tractive effort, or torque, imparted on an axle of the vehicle system, or the like. A type of wheel defect is, e.g., a wheel flat or worn tread. The characteristics associated with the route parameters and the vehicle parameters may be used to determine a ratio of the lateral forces to the vertical forces, and whether the ratio increases or decreases due to the route parameters or the vehicle parameters.

The vehicle systems described herein can be formed from a single vehicle or from two or more vehicles traveling together. With respect to two or more vehicles, the vehicles may be mechanically coupled with each other, or may be separate from each other but communicate with each other so that the vehicles can coordinate the respective movements of the vehicles and travel together as a vehicle system. Such vehicle systems may be a consist, swarm, fleet, platoon, train, and the like. Suitable vehicles may be rail vehicles (e.g., locomotives and/or rail cars). Other suitable vehicles may include automobiles, trucks, buses, mining vehicles, or the like. In at least one example, a vehicle or vehicle system may be, or may otherwise include, an automobile, mining truck, tractor, utility vehicle, cart (such as a golf car or forklift), or the like having rubber wheels and/or tires. Suitable vehicles can include a gasoline or diesel powered vehicle having an internal combustion engine. The vehicle or vehicle system can be an electric vehicle. As another example, the vehicle can be powered through batteries or fuel cells. For example, the route may support non-locomotive applications as non-locomotives travel on a road or route, as well as locomotive applications for locomotives that may move on a steel track.

The lateral forces that are exerted on the route by the wheels of each axle of a multi-axle rail vehicle system may be exerted by one of the wheels in a direction for the wheel to climb the rail of roll the rail over. The lateral forces are offset by the vertical forces that are exerted on the route by the wheels. As the ratio of the lateral to vertical forces increases, the risk for derailment of the locomotive may increase. As the ratio of the lateral to vertical forces decreases, the risk for derailment of the locomotive also decreases.

Additionally, certain axles of a multi-axle vehicle system may demonstrate higher lateral to vertical force ratios than other axles of the multi-axle vehicle system. For example, the wheels of a first or lead axle in the direction of motion of the vehicle system may exert lateral forces on the route that are greater than the lateral forces that are exerted by the other wheels of the other, non-lead axles of the vehicle system. The greater lateral forces of the wheels of the lead axle may be caused by steering moments required to rotate the vehicle system relative to the vehicle chassis or vehicle support platform, may be caused by the reaction to the rear drawbar moment on the vehicle platform, or the like.

In one or more embodiments, the lateral to vertical forces ratio may also be affected by the relative wheel diameter of each wheel from one axle to a different axle within the vehicle bogie. For example, an axle with a first wheel having a diameter that may be smaller than a diameter of a different, second wheel of a different axle will impose a reduced vertical force on the route, and thereby the ratio of the lateral to vertical forces at the first wheel may be greater than the ratio at the second wheel.

Responsive to determining that the ratio increases to a value exceeding a designated threshold as a result of the route or vehicle parameters, an operation of the vehicle system may be changed to reduce the ratio of the lateral forces to the vertical forces to a value less than the designated threshold. For example, the operation of the vehicle that may be changed may include changing a wheel creep of a set of wheels, changing (e.g., preventing or allowing) an application of a friction-modifying substance on the route, changing a tractive effort for one or more of the axles of the vehicle system, redistributing the route effort of each axle of the vehicle system, changing weight distribution exerted by each wheel of the vehicle system by raising a wheel away from the route or raising an axle away from the route, or the like. Changing the operation of the vehicle system may decrease the lateral forces but keep the vertical forces relatively the same, thereby reducing the ratio. Alternatively, changing the operation of the vehicle system may keep the lateral forces relatively the same and may increase the vertical forces, thereby reducing the ratio. Reducing the ratio of the lateral forces to the vertical forces reduces a risk of derailment or other accident relative to the ratio remaining the same or increasing. For example, reducing the ratio of the lateral forces to the vertical forces of the wheels exerted onto the route may reduce a risk of one of the wheels climbing a rail or may reduce a risk of one of the wheels rolling over the rail, relative to the ratio remaining the same or increasing.

FIG. 1 illustrates one embodiment of a vehicle system 100. The vehicle system 100 may include a vehicle control system 101 that may operate to control and/or monitor movement of the vehicle system. The vehicle system travels along a route 106. In the illustrated embodiments, the vehicle system may be a locomotive that travels along the route in a forward direction of movement 108.

The vehicle system may include several axles 105A-F that are disposed between a front end 102 and a rear end 104 of the vehicle system. The axles can represent wheel-axle sets in which each of the wheel-axle sets may include an axle, two wheels coupled to each corresponding axle, and a traction motor. The traction motor of each of the wheel-axle sets of the six axles may be operably coupled to the corresponding axle by a gear, a gear system, or the like. Each of the six axles include two wheels that move over each rail of the route. In the illustrated embodiment, the axle may be the lead or first axle of the vehicle system as the vehicle system travels along the route in the forward direction of movement. Alternatively, the vehicle system may move along the route in a direction that is opposite the direction such that the axle may be the lead axle of the vehicle system. Optionally, the vehicle system may include any number of axles or wheel-axle sets disposed between the front and rear ends.

The vehicle system may be propelled by a propulsion system 109 that represents one or more engines, alternators, generators, traction motors, gear boxes (holding gears that translate rotary motion created by an engine or motor into rotary motion of the wheels and/or axles of the vehicle system). The propulsion system may also be referred to as an electric drive system. The propulsion system or the electric drive system may be electrically coupled to each traction motor of each of the axles. The propulsion system generates designated electrical power to provide separate (e.g., different, individual, or the like) tractive effort to each of the different traction motors to move the corresponding axle and the two wheels of each of the six axles or wheel-axle sets. For example, the designated electrical power may represent an amplitude or waveform for each traction motor to operate in order for each traction motor to move each corresponding axle and two wheels, and thereby move the locomotive along the route. The propulsion system may be supplied with fuel from a fuel source 110, such as a tank of fuel, one or more batteries, or the like. In some vehicles, there may be plural fuel tanks, and fuel may not be used evenly from the fuel tanks during operation. Accordingly, a left/right fuel tank distribution where fuel is removed first from one side may create an imbalance of the vehicle when one of the tanks is empty while the other is full. The controller can account for that by tracking the fuel levels and adjusting vehicle operation responsive to that vehicle parameter, in one embodiment. The vehicle system may include a brake system 112. The brake system may slow or stop movement of the vehicle system. The brake system may represent air brakes, friction brakes, regenerative brakes (e.g., that include one or more traction motors of the propulsion system), or the like.

A vehicle controller 114 represents hardware circuitry that may include and/or may be connected with one or more processors (e.g., one or more microprocessors, field programmable gate arrays, integrated circuits, or the like) that operate to control movement of the vehicle system. The vehicle controller may receive input from an operator onboard and/or off-board the vehicle system via one or more input and/or output devices 116 and, based on the input, change the propulsive force or effort (e.g., torque, power, output, tractive effort, or the like) generated by the propulsion system and/or may chance the braking force or effort generated by the brake system. The input and/or output devices can be one or more touchscreens, display devices, keyboards, pedals, levers, switches, buttons, microphones, speakers, or the like, that receive information from an operator and/or provide information to the operator.

A traction detector 118 represents hardware circuitry that may include and/or may be connected with one or more processors (e.g., one or more microprocessors, field programmable gate arrays, integrated circuits, or the like) that operate to detect wheel slip, wheel rail climb, rail rollover, or the like, between one or more wheels of the vehicle system and the route. The traction detector may communicate with different sensors 120, 122 of the vehicle system to determined speeds measured by the sensors. One of the sensors can be a rotary speed sensor that measures the speed at which one or more wheels of the vehicle system rotate. The rotary speed sensor can include a tachometer, for example. While only a single rotary speed sensor is shown in FIG. 1, the vehicle system may include more than one rotary speed sensor. Another sensor can include a location sensor that determines locations of the vehicle system. For example, the location sensor can include a global positioning system (GPS) receiver, wireless transceiving equipment (that triangulates locations of the vehicle system), or the like. Based on data provided by the location sensor, the speed at which the vehicle system moves along the route can be determined. For example, the GPS receiver can output a speed at which the receiver determines that the vehicle system may be moving along the route.

The vehicle control system may create or change a trip plan of the vehicle system. The trip plan may designate different operational settings at different locations along one or more routes, different times during a trip, and/or different distances along the one or more routes, as described above. The trip plan may be created and/or modified off-board the vehicle system. Optionally, the trip plan may be created and/or modified onboard the vehicle system by an energy management system 134 onboard the vehicle system. The energy management system represents hardware circuitry that may include and/or may be connected with one or more processors (e.g., one or more microprocessors, field programmable gate arrays, integrated circuits, or the like) that create and/or modify trip plans. The energy management system may examine previous trips of the same or other vehicle system, the vehicle characteristics, the route characteristics, and/or other characteristics to determine the operational settings of the vehicle system at different locations along one or more routes, at different distances along the one or more routes, and/or at different times for a trip that reduce fuel consumption and/or emission generation (e.g., relative to the vehicle system traveling on the one or more routes for the trip at an upper speed limit or route speed). The trip plan may be communicated to the vehicle controller (e.g., from a system off-board the vehicle system and/or from the energy management system), and the vehicle controller may automatically generate and communicate control signals to the propulsion system and/or brake system. These control signals may control movement of the vehicle system to follow the operational settings of the trip plan. The control may happen automatically in one embodiment. Optionally, the control signals may be communicated to the operator (e.g., via the input/output device) to instruct the operator how to control the movement of the vehicle system according to the trip plan.

Figure 2:
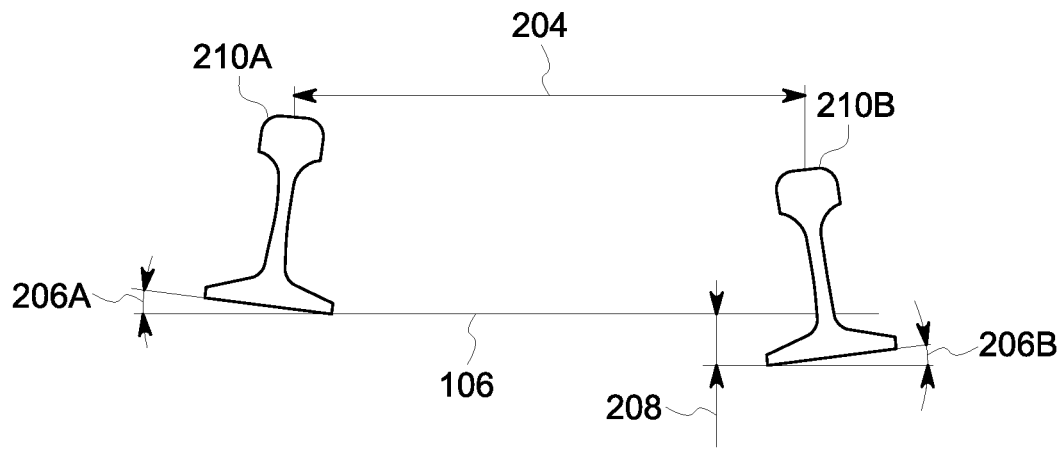
FIG. 2 illustrates a cross-sectional front view of a route.

FIG. 2 illustrates a cross-sectional front view of the route. In the illustrated embodiment, the route is a track that may include two rails 210A, 210B that are spaced apart from each other by a rail gauge 204. Alternatively, the route may be any alternative road, track, single rail track, or the like. In the illustrated embodiment, a first rail 210A may include a first rail inclination 206A and a second rail 210B may include a second rail inclination 206B and a cant 208. For example, the segment of the route illustrated in FIG. 2 may represent a curved section of the route. The curved section of the route may include the cant and the rail inclinations for the wheels of the vehicle system to bank curves. For example, the vehicle system may be able to travel over the curved section of the route at a higher speed due to the cant and the rail inclination relative to a slower moving locomotive that travels over a curved section of the route that does not include a cant and/or a rail inclination.

The first rail inclination may be an angular distance that the first rail may be rotated relative to the route. The second rail inclination is an angular distance that the second rail may be rotated relative to the route. The cant may be a distance the second rail may be disposed below the plane of the route. In the illustrated embodiment, the second rail may be disposed below the horizontal plane of the route by the cant. Alternatively, the first or second rails may be disposed above the horizontal plane of the route such that the first or second rail may be elevated above the horizontal plane of the route.

The curvature of the route at different locations along the route may be determined by one or more processors of the vehicle control system. For example, the curvature may be measured by way of a GPS receiver onboard or off-board the vehicle system, by way of inertial sensors onboard the vehicle system, by reference to the trip plan as described above, that may include GPS position or distance integration of the velocity or speed at which the vehicle system may be moving, or the like. For example, the trip plan may include positions of segments of the route that include curves, as well as a radius of curvature of each curved section of the route. Additionally, the trip plan may also include the rail inclination of each rail of the route at each curved section of the route.

Additionally, the cant may be determined by one or more processors or systems of the vehicle control system. For example, the cant may be measured by way of inertial sensors onboard the vehicle, by reference to the trip plan that may include the GPS position or distance integration of the velocity or speed at which the vehicle system may be moving, or the like. For example, the trip plan may include cant of each rail at each curved section of the route.

Figure 3:
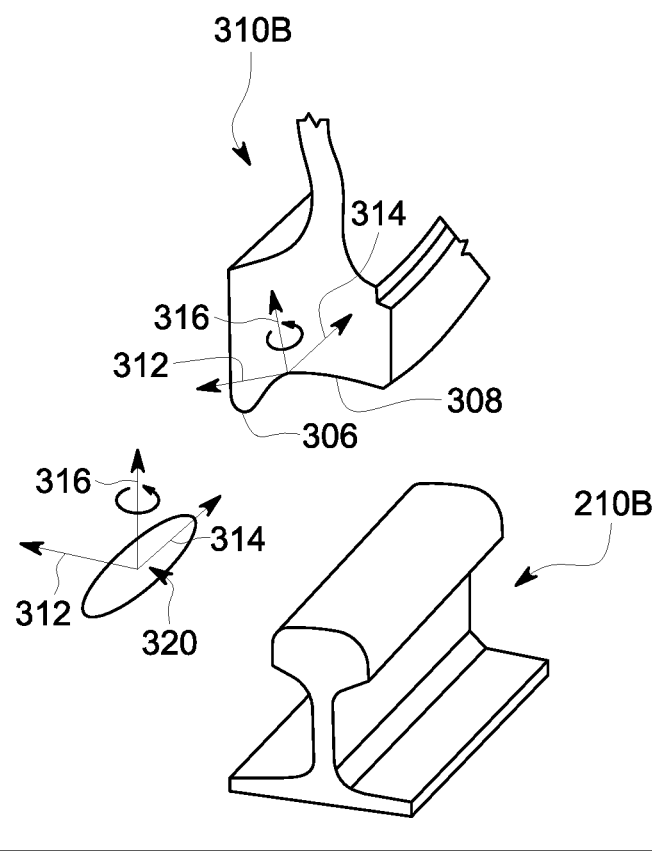
FIG. 3 illustrates a perspective exploded view of forces exerted on one rail of a track by a wheel.
Figure 4:
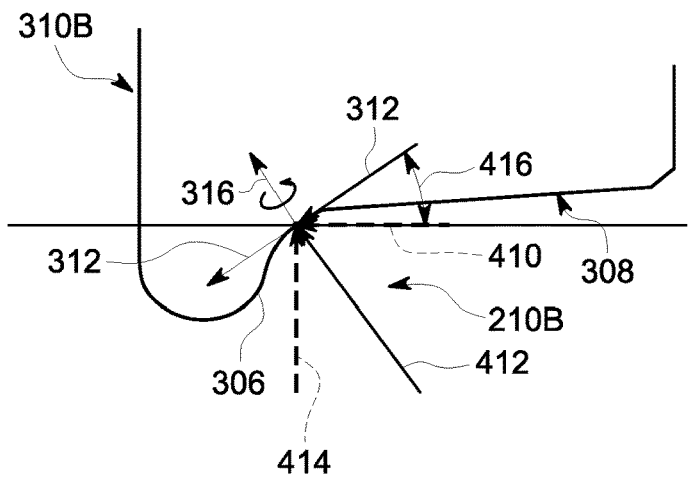
FIG. 4 illustrates the forces of FIG. 3 exerted by the wheel on the rail of the route.

As the vehicle system moves along the route, each of the wheels of each axle exerts lateral forces and vertical forces onto each rail of the route. FIG. 3 illustrates an exploded view of the forces exerted onto the second rail of the route and by a wheel 310B. FIG. 4 illustrates a front view of the forces exerted by the wheel onto the second rail of the route. The wheel may include a flange 306 and a running surface 308. A contact patch 320 illustrates the contact between the rail and the flange and running surface of the wheel.

The interaction between the wheel and the rail may have a longitudinal creep force 314, a lateral creep force 312, and a spin creepage moment 316. Creep and slip are synonymous. A lateral normal force 412 may be exerted by the rail onto the contact patch of the wheel. A lateral force 410 and a vertical force 414, and the ratio of the lateral force to the vertical force, may be determined at least in part using the lateral creep force, the lateral normal force, and a contact angle 416 that extends between the lateral creep force and the horizontal plane of the rail. As the ratio of the lateral force to the vertical force increases, the risk of derailment increases. Alternatively, as the ratio of the lateral force to the vertical force decreases, the risk of derailment decreases.

Switching from locomotives to another vehicle type where the vehicle is, for example, an automobile, the risk would be of sliding off of the route or out of a lane on the route. In at least one example, such as when the vehicle system has rubber wheels (such as wheels having rubber tires secured around rims), a traction and/or grip coefficient can be used to set one or more thresholds for the ratio(s). In at least one example, the threshold can be dynamically adjusted, such as by a controller, control unit, operator, or the like. The ratio threshold can be adjusted based on conditions of a path, track, road, or such route on which the vehicle travels. The route can be affected by weather conditions. Characteristics of the route may vary depending on an ambient temperature, ambient pressure, presence of precipitation, wind conditions, and/or the like. For example, a route when it is 75° F., sunny, and no precipitation has different characteristics than when it is 25° F. and snowing. In at least one example, the control unit, controller, or the like may lower the threshold value in response to the presence of certain weather conditions, such as when there is rain or snow. The threshold value may be lowered to account for higher lateral forces, as an example. As another example, the control unit, controller, or the like may increase the threshold value in response to predetermined fair weather conditions, such as a temperature within a predetermined range (such as between 68°-78° F.) with no precipitation. In at least one example, the control unit or controller may be in communication with a weather forecast system and/or various sensors (such as a thermometer, barometer, precipitation sensor, and the like) to determine current weather conditions, and adjusts the threshold value in response thereto. The control unit or controller can continually detect the weather conditions and automatically adjust the threshold value in real time. Another factor the controller may monitor, consider, and/or respond to is the tire inflation pressure. As the tire inflation pressure decreases, generally, the surface contact area increases. In one embodiment, the threshold of the acceptable lateral force of the tire against the rim may be adjusted, and this may be in conjunction with or independent of the lateral force threshold of the wheel versus the route surface.

In one example, a longitudinal creep force that may be greater than a threshold value will reduce the lateral creep force, thereby causing a redistribution of a needed or necessary amount of lateral creep force to the flange of the wheel, or to other wheels and/or axles of the vehicle system. A reduction in the lateral creep force may be limited by contact between the flange and the rail when the lateral normal force increases as the contact angle increases.

In one or more embodiments, the longitudinal creep force, the lateral creep force, and the spin creepage moment, individually or combined, may become too high, such that the forces exceed a threshold value, and may cause the contact patch to slide. The total resultant force (e.g., moment) created by the contact patch will be saturated. The relationship between the individual forces (e.g., tangential and/or moment forces) will be governed or controlled by a saturation surface. If the saturation may be caused by a dominant longitudinal creep force (e.g., due to high creep and relative tractive effort of the wheel), the lateral creep force will decrease, and the total lateral force may decrease as a result.

Figure 5:
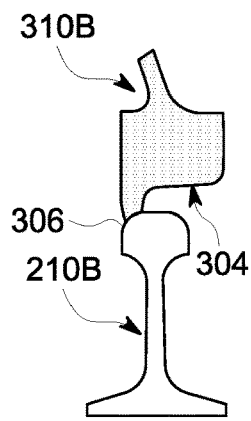
FIG. 5 illustrates one embodiment of a wheel rail climb.
Figure 6:
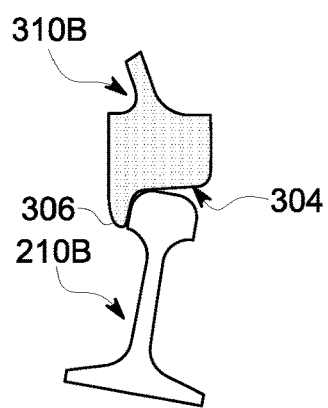
FIG. 6 illustrates one embodiment of a wheel rail rollover.

When the vehicle system encounters the curved section of the route as illustrated in FIG. 2, the vehicle system may be at risk of derailing from the route based on the lateral forces and the vertical forces exerted by the wheel onto the rail, as described above. As one example, the vehicle system may derail by one or more wheels climbing the rail. FIG. 5 illustrates one embodiment of the wheel that is derailed from the route by the wheel climbing over the second rail. For example, the wheel exerts a lateral force on the rail that may be great enough to force the flange of the wheel to climb up and/or over the rail. As another example, the vehicle system may derail by one or more wheels rolling the rail over. FIG. 6 illustrates one embodiment of the wheel that may be derailed from the route by the wheel forcing the second rail to roll over. For example, the wheel exerts a lateral force on the rail that may be great enough to force the rail to bend, buckle, become disengaged from the route, or the like.

The ratio of the lateral force to the vertical force may be affected by one or more parameters or factors. The lateral force may be affected by parameters or factors of one or more of the route, the wheels, or the vehicle. Additionally, the vertical force may be affected by parameters or factors of one or more of the route, the wheels, or the locomotive. The parameters that affect the lateral force and the vertical force may the same route or vehicle parameters, may be different route and vehicle parameters, or a combination therein.

The one or more route parameters may be referred to as route characteristics that represent one or more aspects or qualities of the route. In various examples, the route parameters may include absolute, average or min/max cant, a change in a cant of the route, an inclination, a change in an inclination of the route, route integrity, route curvature or a radius of curvature, a route incline or decline (e.g., going up or down a hill) or the like. In one example, the radius of curvature of the curved section of the route may be 5 degrees. In other examples, the radius may be more or less than 5 degrees. The route parameters may affect the lateral and/or the vertical forces exerted by the wheel on the rail of the route.

The vehicle parameters may be referred to as vehicle characteristics and can represent one or more qualities or operational aspects of the vehicle. The vehicle parameters may include a wheel defect, such as a flat spot, tread depth, tire pressure, a wheel diameter, relative differences of the wheel diameter between different wheels of the vehicle system, the relative position of the axle, the position of a locomotive within a train or consist, an axle to route angle of attack, wheel lubrication, the weight of the vehicle (e.g., a static vehicle or moving vehicle), a fuel level of the vehicle, weight management cylinder pressures (e.g., actuators) of each of the axles, loaded or unloaded status, and the like. Various vehicle parameters may be obtained depending on situational aspects. For example, a tire inflation pressure may be obtained using an in-tire pressure sensor, a tread depth may be obtained using a handheld depth gauge or may be calculated based on a known wear rate and the distance traveled, and a fuel level may be obtained using a fuel level sensor or calculated using a known fuel-use rate and the operating duty since last fuel top off, and the like.

Optionally, one or more alternative or external parameters may affect the lateral and/or vertical forces that may be exerted by the wheel on the route. For example, a weather condition (e.g., rain, snow, heat, sleet, or the like) may affect one or more forces exerted by the wheel on the route. In addition, the presence (and amount) or absence of an adhesion modifier (such as sand or lubricant) on the route.

Based on a route parameter, a vehicle parameter, and/or alternative parameter, the vehicle system may be likely to experience rail climb and/or rail rollover at various locations, as described above. The vehicle controller may determine whether a ratio of the lateral force (e.g., a lateral force exerted by one or more wheels of the vehicle system, as described above) to the vertical force of one or more of the wheels on the route, as described above, increases to a value exceeding a designated threshold as a result of the route parameter, the vehicle parameter, and/or the alternative parameter. To reduce the risk of the predicted wheel from climbing the route rail, from rolling the rail over (or reduce the number of wheels that climb or roll the rail over), the trip plan may be created or modified by the energy management system or one or more systems off-board the vehicle system to avoid the one or more wheels from climbing or rolling over the rail. This may be accomplished by an inter-vehicle distribution or re-distribution of the tractive efforts generated by different axles and corresponding wheels in the vehicle system, or the like.

The ratio of the lateral force to the vertical force exerted by one or more wheels of the vehicle system on the route may increase as a result of one or more of the route parameters, vehicle parameters, or alternative parameters as described above. To reduce the risk of derailment of the vehicle system from the route due to one or more parameters, an operation of the vehicle system may be changed. For example, changing one or more operations of the vehicle system may decrease the lateral forces but keep the vertical forces relatively the same, thereby reducing the ratio. Alternatively, changing one or more operations of the locomotive may keep the lateral forces relatively the same and may increase the vertical forces, thereby reducing the ratio.

In one embodiment, the route parameter may include determining that the vehicle system may be moving toward a curved section of the route. For example, the input/output device may display an approaching curved section of the route based on the trip plan, or the like. For example, an operator may be notified by one of the input/output devices that the vehicle system may be approaching a curved section of the route.

As the vehicle system may be moving towards the curved section of the route, the operator may change one or more operations of the vehicle system in order to reduce the lateral to vertical forces ratio to a ratio value that may be less than a designated threshold, and thereby reduce the risk of derailment at the curved section of the route. For example, the operator may change a setting of the propulsion system and/or the brake system to change a torque that may be imparted on one of the axles of the locomotive by one or more motors of the propulsion system. Optionally, the operator may change the propulsion system to change the torque that may be imparted on the first or lead axle with or without concurrently changing a torque imparted on one or more of the other axles of the vehicle system.

In one or more embodiments, the operator may change a tractive effort that may be generated by a motor-axle combination between one or more motors of the propulsion system and the corresponding axle of the vehicle and/or the vehicle system. Optionally, the operator may change the tractive effort of the traction motor of the first or lead axle with or without changing a tractive effort of the traction motors of the other axles of the vehicle system.

Figure 7:
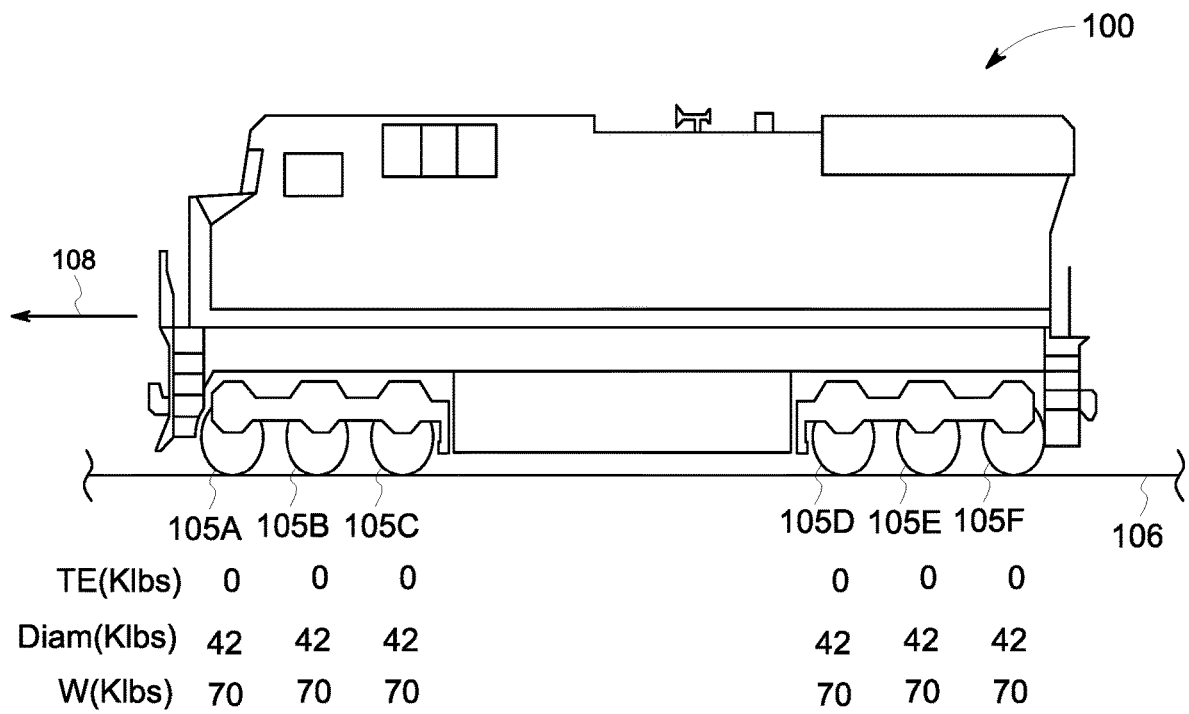
FIG. 7 illustrates one example of operating a vehicle system.

FIG. 7 illustrates one example method of operating the vehicle system. The vehicle system travels along the route in the forward direction of movement. The separate tractive effort (TE) that may be generated by a motor-axle combination of each axle or wheel-axle set, the corresponding wheel diameter of each wheel of each axle, and the weight (e.g., vertical force) exerted by each wheel of each axle are indicated. The values of the tractive effort, wheel diameter, and weight in FIG. 7 are for illustrative purposes.

Figure 8:
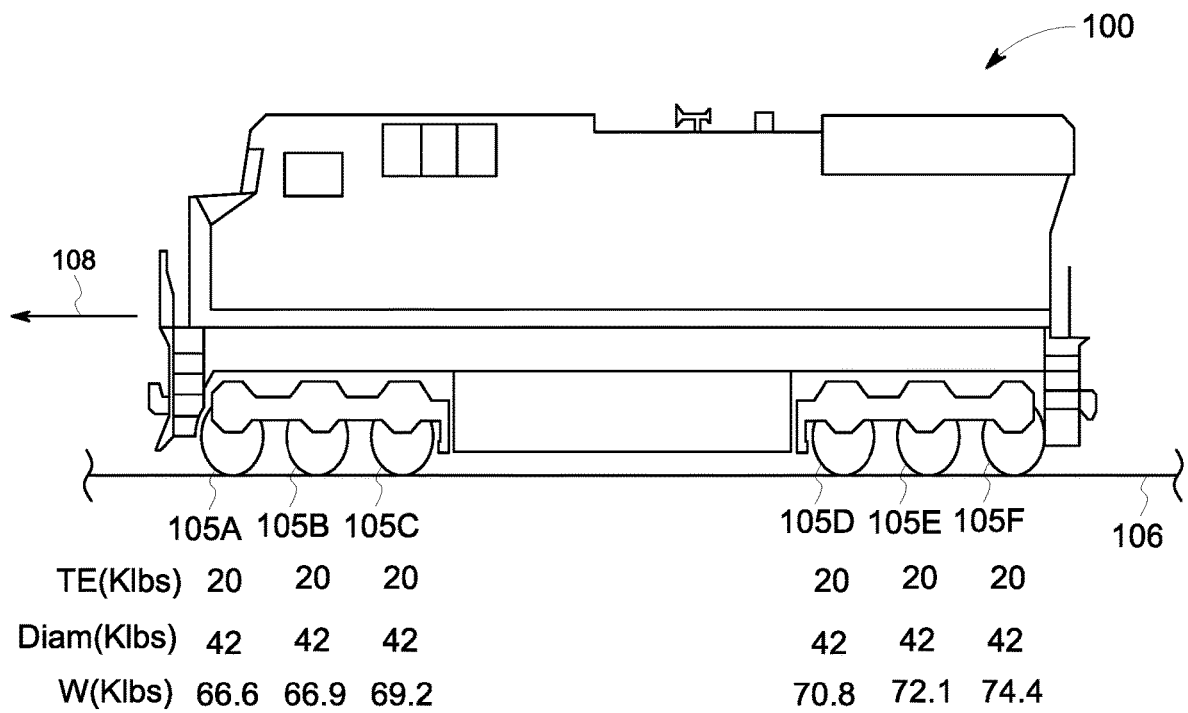
FIG. 8 illustrates one example of changing an operation of the vehicle system of FIG. 7.

FIG. 8 illustrates one example of changing an operation of the vehicle system of FIG. 7. The change in operation may include changing the tractive effort (TE) that may be generated by the motor-axle combination between the motors of the propulsion system and each of the corresponding axles. In the illustrated embodiment, the tractive effort generated by each of the axles may be substantially the same. Assuming that the lateral forces remain substantially constant, and that the total locomotive moment to yaw remains substantially constant, changing the tractive effort of each of the axles changes the weight that each of the wheels exerts onto the surface of the route. For example, the weight of the lead axle may decrease from 70 to 66.6. Decreasing the weight (e.g., the vertical force), increases the ratio between the lateral force to the vertical force of the wheel of the first axle that may be exerted onto the route. Alternatively, the weight of the last axle may increase from 70 to 74.4. Increasing the weight (e.g., the vertical force), decreases the ratio between the lateral to vertical forces of the wheel of the last axle that may be exerted onto the route. For example, by increasing the tractive effort of each of the axles by the same or substantially the same value, the risk of the wheels of the lead axle derailing increases, and the risk of the wheels of the last axle derailing decreases.

Figure 9:
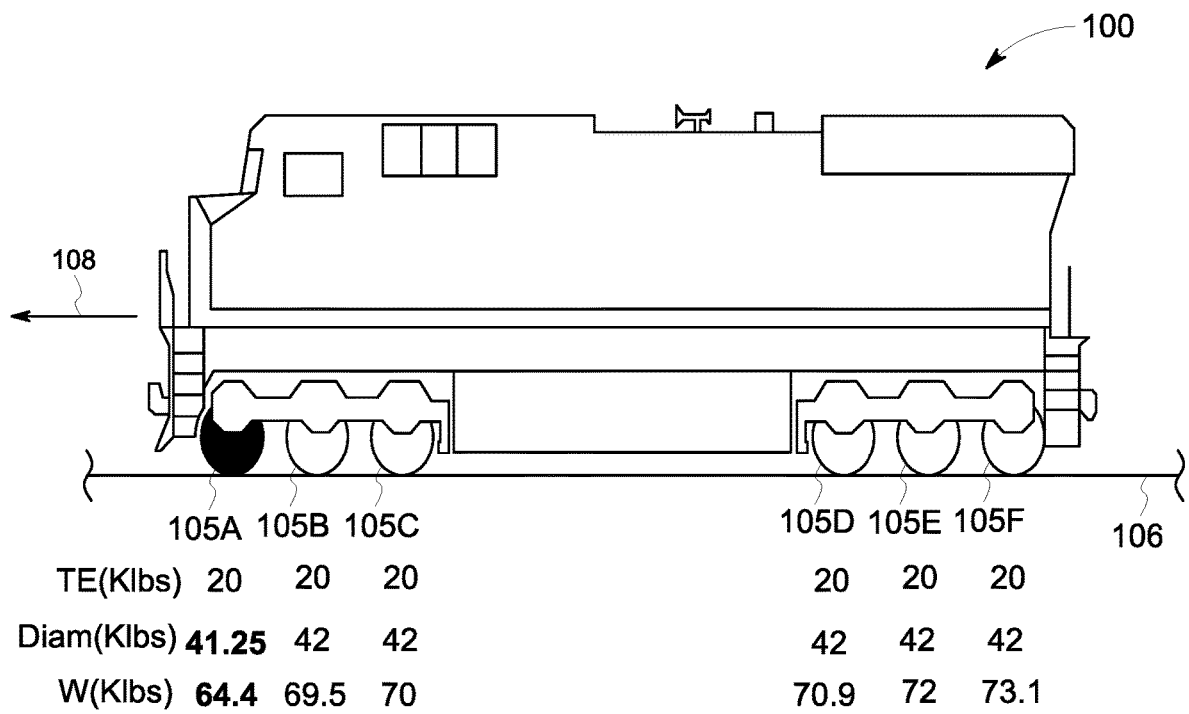
FIG. 9 illustrates a second example of changing an operation of the vehicle system of FIG. 8.

FIG. 9 illustrates a second example of changing an operation of the vehicle system of FIG. 8. The change in operation may include changing the wheel diameter of the wheel of the first or lead axle relative to the wheel diameters of the other wheels of the other axles. For example, the wheels of the lead axle may include a defect, such as a flat spot, may be worn, or the like. In the illustrated embodiment, the tractive effort generated by each of the axles may be substantially the same. Changing the wheel diameter of the wheels of the lead axle reduces the weight (e.g., the vertical force) from 66.6 to 64.4. Additionally, the change in the wheel diameter of the wheel of the lead axle also changes the weight (e.g., vertical forces) exerted by the wheels of each of the other axles (e.g., from the weights illustrated in FIG. 8 to the weights illustrated in FIG. 9). For example, reducing the size of the wheel of the lead axle decreases the vertical force exerted by the wheel of the lead axle onto the route, and thereby increases the ratio of the lateral to vertical forces and increases the risk of the wheels of the lead axle derailing.

Figure 10:
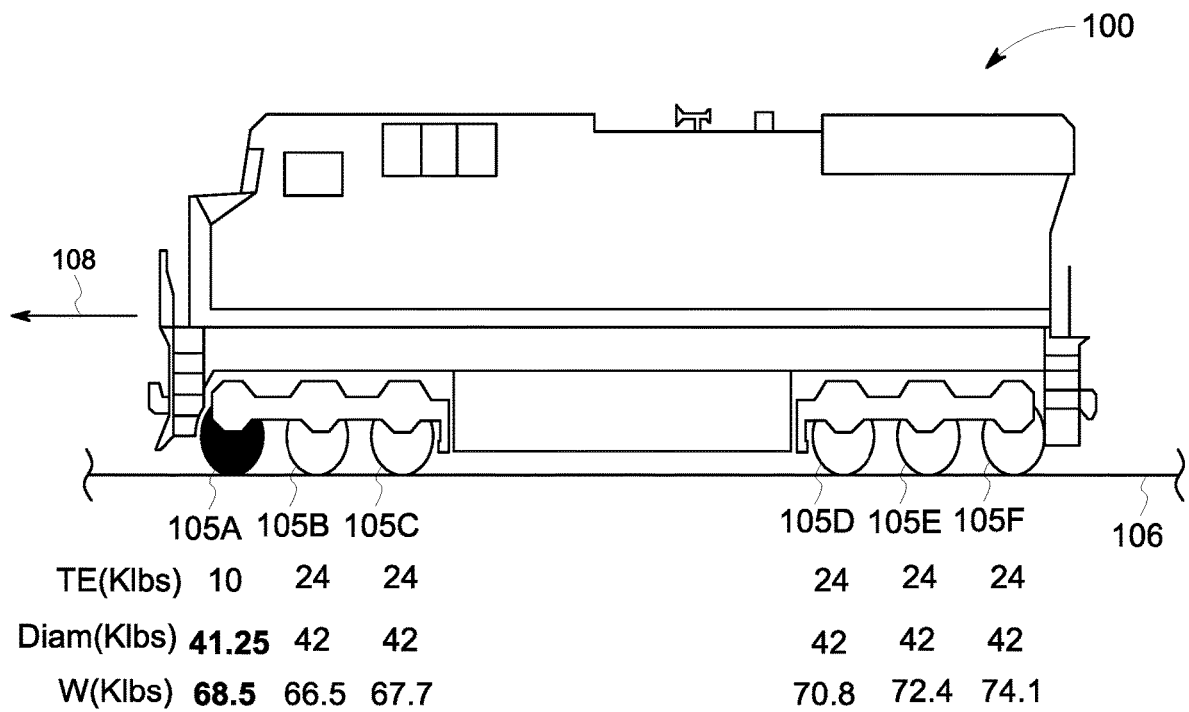
FIG. 10 illustrates a third example of changing an operation of the vehicle system of FIG. 9.

FIG. 10 illustrates a third example of changing an operation of the vehicle system of FIG. 9. The change in operation may include redistributing the tractive effort (TE) that may be generated by the motor-axle combination of each axle of the vehicle system. For example, the propulsion system may separately change the tractive effort generated by the first or lead axle and may redistribute the changed tractive effort to the other axles so that the vehicle system may continue to operate at the same speed and power. For example, each traction motor of each of the axles may be provided with different designated electrical power that provides the separate tractive effort to move the corresponding axle and two wheels—individual axle control. Alternatively, the operation may include changing the tractive effort that is generated by the lead axle without concurrently changing the tractive effort that is generated by the other axles (e.g., without redistributing the power settings of the vehicle system). In one example, decreasing the tractive effort that may be generated by the lead axle from about 20 to 10, increases the tractive effort that may be generated by each of the other axles from about 20 to 24. Additionally, decreasing the tractive effort that may be generated by the lead axle increases the weight (e.g., the vertical force) from 64.4 (of FIG. 9) to 68.5 that may be exerted by the wheels of the lead axle on to the route. Increasing the vertical force exerted onto the route, decreases the ratio of the lateral to vertical forces and thereby reduces the risk of the wheels of the lead axle from derailing. Similarly, the same may be true for a wheel on a road.

In the illustrated embodiments of FIGS. 7 through 10, the operation of the lead axle of the vehicle system may be changed based on the position of the axle in the vehicle system. For example, the lead axle of the vehicle system traveling in the forward direction at a curved section of the route may exert lateral forces on the rail that are greater than the lateral forces of the other axles. The lateral forces of the lead axle may be greater because of steering moments that may be required to rotate the vehicle system relative to the vehicle chassis, in response to a drawbar moment at the rear end of the vehicle system on the route, or the like.

In one or more embodiments, the operation of the vehicle system may be changed for one axle of the locomotive based on the position of the axle in the vehicle system. Optionally, the operation may be changed for a single axle based on the position of the axle relative to one or more other axles of the vehicle system. Optionally, the operation of the vehicle system may be changed for several axles in a single chassis (e.g., bogie or frame) or the vehicle system (e.g., locomotive consist) based on a position of the single bogie in the locomotive. Optionally, the operation may be changed based on the position of the single bogie relative to one or more other bogies of the vehicle system.

Figure 11:
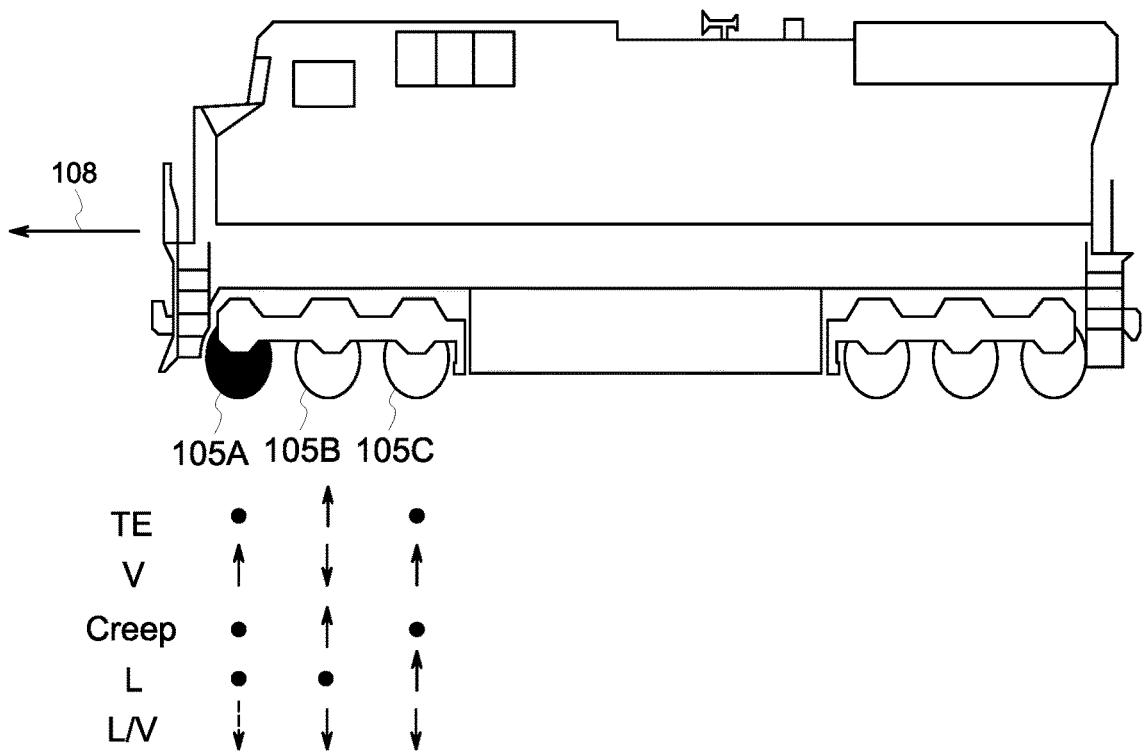
FIG. 11 illustrates one example of a route parameter or vehicle parameter affecting a ratio of lateral forces to vertical forces exerted by wheels of a vehicle system.

FIG. 11 illustrates one example of route parameters or vehicle parameters affecting a ratio of lateral forces to vertical forces exerted by wheels of the vehicle system. Assuming that the lateral forces remain substantially constant, that the total vehicle moment to yaw remains substantially constant, based on the position of each axle-C within the vehicle system and relative to each other axle-C, changing the operation of the vehicle system affects route parameters or vehicle parameters of each other axle-C. For example, the tractive effort of the lead axle remains substantially unchanged, the tractive effort of the second axle increases, and the tractive effort of the third axle remains substantially unchanged. Additionally, a wheel creep of the set of wheels of the lead axle remains substantially unchanged, the wheel creep of the set of wheels of the second axle increases, and the wheel creep of the set of wheels of the third axle remains substantially unchanged.

Increasing the tractive effort and the wheel creep of the second axle may affect the vertical forces of the lead axle. For example, by increasing the tractive effort and the wheel creep of the second axle, the vertical forces of the lead axle may increase and the lateral forces of the lead axle may remain substantially unchanged, thereby reducing the risk of derailment of the wheels of the lead axle.

Figure 12:
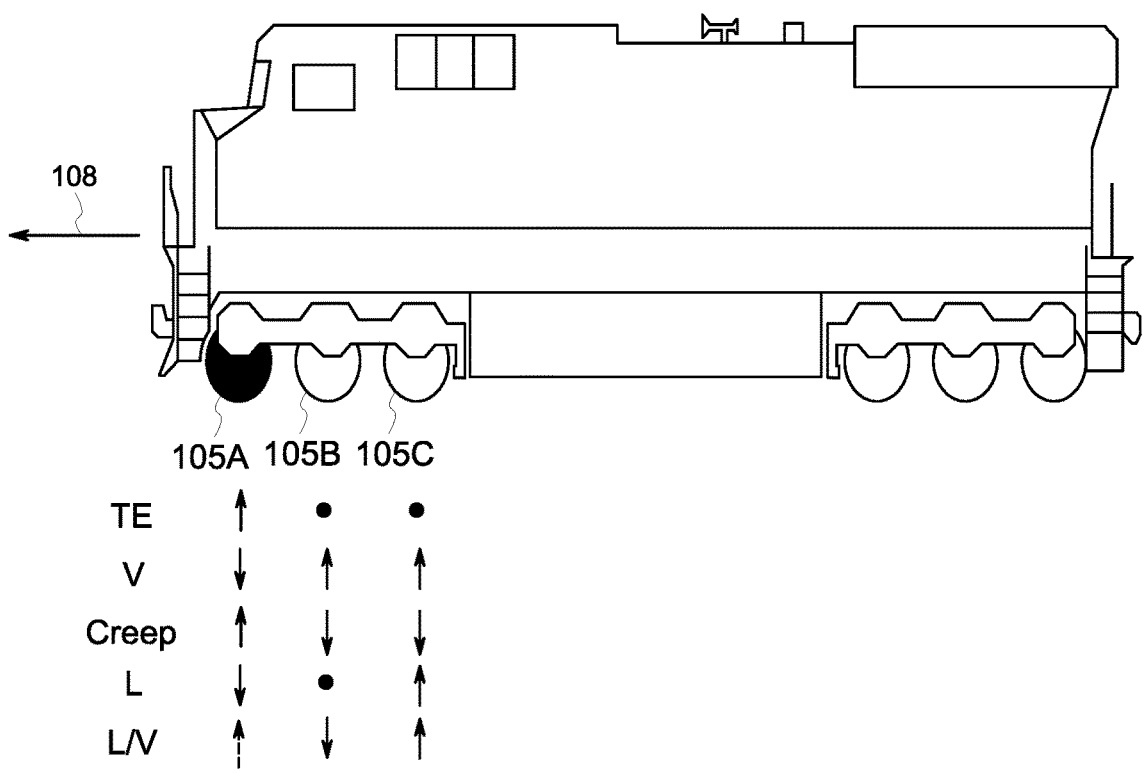
FIG. 12 illustrates a second example of a route parameter or vehicle parameter affecting a ratio of lateral forces to vertical forces exerted by wheels of a vehicle system.

FIG. 12 illustrates a second example of route parameters or vehicle parameters affecting a ratio of lateral forces to vertical forces exerted by wheels of the vehicle system. Changing the operation of the vehicle system affects route parameters or vehicle parameters of each other axle. For example, the tractive effort of the lead axle and the wheel creep of the set of wheels of the lead axle increases. The tractive effort of the second and third axles remain substantially unchanged, and the wheel creep of the wheels of the second and third axles decreases.

Changing the tractive effort and the wheel creep of the wheels of the lead axle affects the vertical forces and the lateral forces of the lead axle. Increasing the tractive effort decreases the vertical forces of the lead axle, however increasing the wheel creep of the wheels of the lead axle decreases the lateral forces of the lead axle. The route parameters and the vehicle parameters of FIG. 12 illustrate that increasing wheel creep increases the ratio of the lateral to vertical forces, and thereby increases the risk of derailment of the wheels of the lead axle. In the illustrated embodiment, the wheel creep of the wheels of the lead axle may be changed without concurrently changing the wheel creep of the wheels of the other axles. Optionally, the wheel creep (or slip) of the wheels of the second and third axles may change (e.g., increase or decrease)

In one or more embodiments, the change in operation of the vehicle system may include preventing an application of a friction-modifying substance to the route by a wheel adhesion control system 132 disposed onboard the vehicle system. Optionally, the wheel adhesion control system may be referred to herein as a friction modification system. The system may be coupled to the chassis or platform of the vehicle system. The vehicle controller may controllably apply the friction-modifying substance to the route while the vehicle system travels over a section of the route associated with the route or vehicle parameter that may be determined. For example, the friction modification system or the wheel adhesion control system may apply the friction-modifying substance to plural rail-wheel interfaces between the rail of the route and the wheels ahead of the wheels in a direction of travel of the vehicle system. The friction-modifying substance may be sand, air, or the like, that may be dispensed onto the surface of the route by an adhesion modifying device 130 of FIG. 1 (e.g., a pump or other dispenser) from a tank or other container onboard the vehicle system or from an air compressor. The friction-modifying substance may affect the lateral forces exerted by the wheels of the vehicle system by increasing friction between the wheels and the route. The rail conditioning mechanism (e.g., applying a friction-modifying substance) increases traction between the wheels and the route, however the rail conditioning mechanism also increases lateral forces at the wheel rail contact area.

In one or more embodiments, the change in operation of the vehicle system may include raising one or more of the axles of the vehicle system away from the route relative to one or more other axles. For example, the propulsion system may include one or more actuators or cylinders that may be operably coupled with one or more of the axles. The vehicle controller may direct the propulsion system to change the actuator or cylinder pressure in order to raise or lower one or more of the axles away from or closer to the route. For example, the lead axle may be raised away from the route while the vertical position of the other axles remains substantially unchanged. Raising or lowering the axles closer to or further away from the route changes the vertical forces the wheels exert onto the route.

In one or more embodiments, the change in operation of the vehicle system may include raising a wheel of the vehicle system away from the route relative to one or more other wheels of the vehicle system. For example, the vehicle controller may direct the propulsion system to change the actuator or cylinder pressure in order to raise one wheel of the lead axle away from the route while the vertical position of the other wheel of the lead axle remains substantially unchanged. Raising or lowering wheels of the vehicle system closer to or further away from the route changes the vertical forces each of the wheels exerts onto the route.

Figure 13:
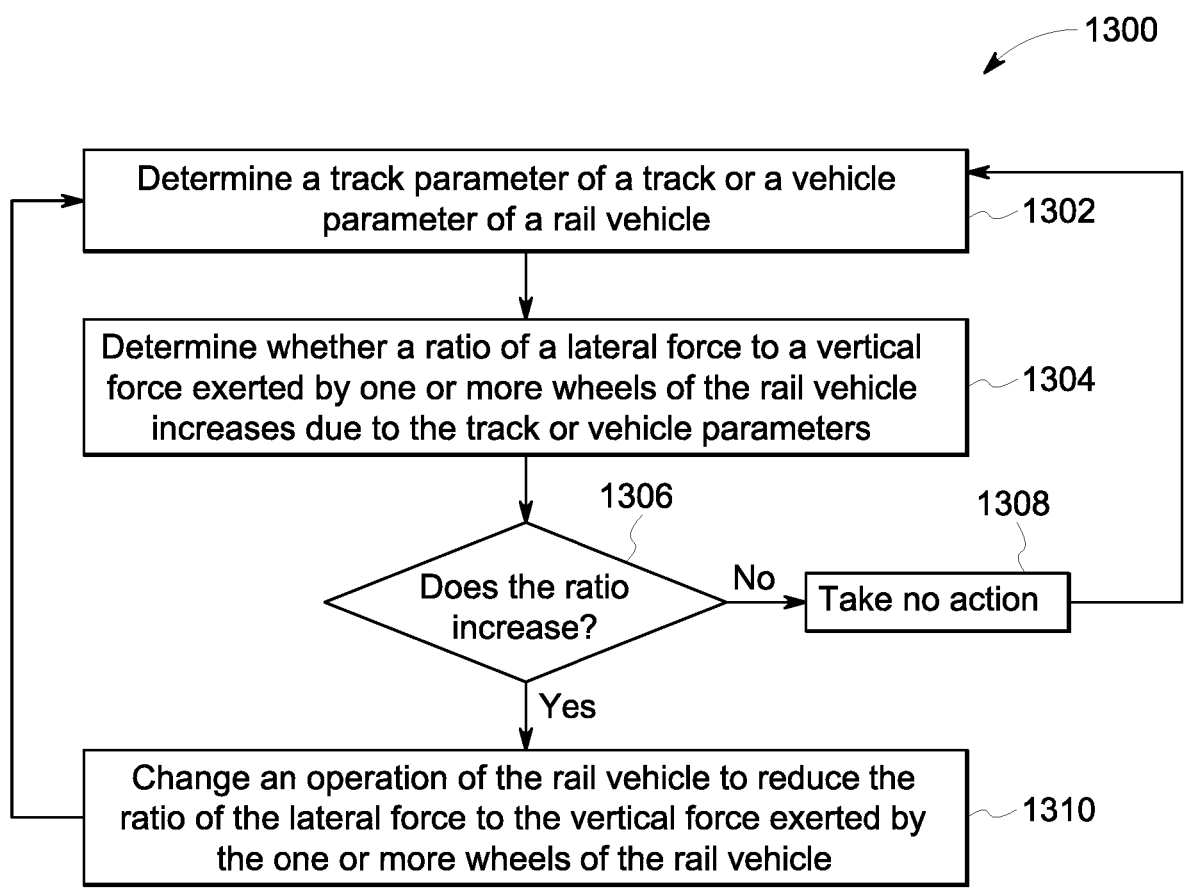
FIG. 13 illustrates a flowchart of one embodiment of a method for reducing a risk of vehicle system derailment from a route.

FIG. 13 illustrates a flowchart 1300 of one embodiment of a method for reducing a risk of one or more wheels of the vehicle system from derailing from the route. At step 1302, one or more processors of the vehicle control system determines a route parameter of the route or a vehicle parameter of the vehicle system. The route parameter may affect the lateral force exerted by one or more wheels of the vehicle system on the route and/or may affect the vertical force exerted by the one or more wheels of the vehicle system on the route. The vehicle parameter may affect the lateral force exerted by one or more wheels of the vehicle system on the route and/or may affect the vertical force exerted by the one or more wheels of the vehicle system on the route. For example, the route parameter may affect both the lateral and vertical forces and the vehicle parameter may affect both the lateral and vertical forces.

In one or more embodiments, the route parameter may include a determining that the vehicle system may be moving towards a curved section of the route, may include determining a radius of curvature of the curved section of the route, may include determining a cant and/or inclination of the route, may include determining a change in a cant and/or a change in an inclination of the route, or the like. The route parameter may be determined by reviewing a trip plan, by data collected by one or more sensors (e.g., inertial sensors, GPS receivers, or the like), or the like.

The vehicle parameter may include a wheel defect in one wheel of the vehicle system, may include determining a wheel diameter of a wheel of the vehicle system, may include determining a relative difference in wheel diameters between wheels coupled with different axles of the vehicle system, or the like. Wheel defects may include such as a bald or flat spot. Optionally, the vehicle parameter may be based on a position of one axle of a vehicle relative to the other axles of the vehicle, a position of the vehicle within a vehicle consist relative to other vehicles of the vehicle consist, or the like.

The route and/or vehicle parameters may affect the lateral and/or vertical forces that are exerted by each of the wheels of the vehicle system on the route. At step 1304, a determination may be made whether a ratio of the lateral forces to vertical forces exerted by the wheels of the vehicle system increases to a value exceeding a designated threshold as a result of the route and/or vehicle parameters. For example, the route or vehicle parameters may increase the lateral forces while the vertical forces remain substantially unchanged, thereby increasing the ratio. Optionally, the route or vehicle parameters may not affect the lateral forces (e.g., remain substantially unchanged) while the vertical forces may be increased, thereby reducing the ratio. Optionally, the lateral and vertical forces may both increase but the value of the lateral force increases by an amount that may be greater than the increase of the vertical force and thereby increases the ratio. Optionally, the lateral and vertical forces may both decrease but the value of the vertical force decreases by an amount that is greater than the decrease of the lateral force and thereby increases the ratio. Optionally, the ratio may increase or decrease by any other combination of one or more of the lateral or vertical forces increasing or decreasing.

At step 1306, a decision may be made whether the ratio of the lateral forces to the vertical forces increases. If the ratio remains substantially unchanged or decreases, then flow of the method proceeds to step 1308 and no action is taken. The flow of the method returns to step 1302 and a route parameter and vehicle parameters may be determined for a different, segment of the route.

If the ratio increases to a value exceeding the designated threshold, then flow of the method proceeds towards step 1310. At step 1310, an operation of the vehicle system is changed to reduce the ratio of the lateral force to the vertical force exerted by the wheels of the vehicle system to a value that is less than the designated threshold. The operation that is changed may by changing a torque imparted on one axles of the vehicle system with or without concurrently changing a torque imparted by a different axle, changing a tractive effort generated by a motor-axle combination of one axle with or without concurrently changing a tractive effort generated by another axle, changing a wheel creep of a set of wheels of the vehicle system with or without concurrently changing a wheel creep of a different set of wheels of the vehicle system, preventing the application of a friction-modifying substance to the route, changing a cylinder pressure to raise a wheel away from the route relative to another wheel, changing a cylinder pressure to raise one axle away from the route relative to another axle, or the like.

Optionally, the vehicle control system may determine whether different ratios of the lateral forces exerted by the wheels of the different wheel-axle sets or axles of the vehicle system on the route to vertical forces exerted by the wheels of the vehicle system on the route increase to values exceeding a designated threshold as a result of the route parameter or the vehicle parameter that is determined. For example, each of the wheels of the different axles may have different ratios of lateral to vertical forces exerted by each of the wheels on the route. The vehicle control system may control the reduction of one or more of the different ratios to values less than the designated threshold by controlling the friction modifying system of the wheel adhesion control system concurrently with controlling the separate tractive effort provided to each of the different traction motors as a function of wheel diameter, track curve magnitude, or the like.

Optionally, the operation of the vehicle system that is changed may be changed for an axle of the vehicle system based on a position of the axle in the vehicle system, may be changed for a single axle based on a position of the single axle relative to one or more other axles, may be changed for several axles in a single bogie of the vehicle system based on a position of the single bogie in the vehicle system, may be changed for several axles in a single bogie of the vehicle system based on a position of the single bogie relative to another bogie of the vehicle system, or the like.

In one example of the subject matter described herein, a method for controlling a vehicle system may include determining one or more of a route parameter of a route on which the vehicle system is moving or a vehicle parameter of the vehicle system. The method may also include determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route may be reduced to a value less than the designated threshold by changing an operation of the vehicle system.

Determining the one or more route parameter of vehicle parameter may include determining that the vehicle system is moving toward a curved section of the route. The one or more route parameter or vehicle parameter that is determined may include a radius of curvature of a curved section of the route. The one or more route parameter or vehicle parameter that is determined may include a cant of the route. The one or more route parameter or vehicle parameter that is determined may include a change in a cant of the route. The one or more route parameter or vehicle parameter that is determined may include a wheel defect in a wheel of the vehicle system. Optionally, the wheel defect is a flat spot in the wheel of the vehicle system. The one or more route parameter or vehicle parameter that is determined may include a wheel diameter of a wheel of the vehicle system. The one or more route parameter or vehicle parameter that is determined may include a relative difference in wheel diameters between wheels coupled with different axles in the vehicle system. The operation of the vehicle system may be changed by changing a torque imparted on an axle of the vehicle system by one or more motors. The operation of the vehicle system may be changed by changing the toque imparted on the axle of the vehicle system by the one or more motors without concurrently changing a torque imparted on another axle of the vehicle system by one or more other motors.

Optionally, the operation of the vehicle system is changed by changing a tractive effort generated by a motor-axle combination of the vehicle system. The operation of the vehicle system may be changed by changing the tractive effort generated by the motor-axle combination of the vehicle system without concurrently changing a tractive effort generated by another motor-axle combination of the vehicle system. The operation of the vehicle system may be changed by changing a wheel creep of a set of wheels coupled with an axle of the vehicle system. The operation of the vehicle system may be changed by changing the wheel creep of the set of wheels coupled with the axle without concurrently changing a wheel creep of another set of wheels coupled with another axle of the vehicle system. The operation of the vehicle system may be changed by preventing application of a friction-modifying substance to the route by a wheel adhesion control system disposed onboard the vehicle system. The operation of the vehicle system may be changed by preventing application of the friction-modifying substance to the route by the wheel adhesion control system while the vehicle system travels over a section of the route associated with the one or more route parameter or vehicle parameter that is determined.

The operation of the vehicle system may be changed for an axle of the vehicle system based on a position of the axle in the vehicle system. The operation of the vehicle system may be changed for a single axle of the vehicle system based on a position of the single axle in the vehicle system relative to one or more other axles of the vehicle system. The operation of the vehicle system may be changed for several axles in a single bogie of the vehicle system based on a position of the single bogie in the vehicle system. The operation of the vehicle system may be changed for several axles in a single bogie of the vehicle system based on a position of the single bogie in the vehicle system relative to one or more other bogies of the vehicle system.

The operation of the vehicle system that is changed may include raising a wheel of the vehicle system away from the route relative to one or more other wheels of the vehicle system. The operation of the vehicle system that is changed may include raising an axle of the vehicle system away from the route relative to one or more other axles of the vehicle system. In one example of the subject matter described herein, a vehicle control system may include one or more processors that may determine one or more of a route parameter of a route on which a vehicle system is moving or a vehicle parameter of the vehicle system. The vehicle system may move along the route and may include one or more wheels. The one or more processors may determine whether a ratio of a lateral force exerted by the one or more wheels of the vehicle system on the route to a vertical force exerted by the one or more wheels of the vehicle system on the route increases to a value exceeding a designated threshold as a result of the one or more route parameter or the vehicle parameter that is determined. The one or more processors may control reduction of the ratio of the lateral force to the vertical force exerted by the one or more wheels of the vehicle system on the route to a value less than the designated threshold by changing an operation of the vehicle system.

The one or more processors may determine that the vehicle system is moving toward a curved section of the route. The one or more route parameter or vehicle parameter that is determined may be a radius of curvature of a curved section of the route. The one or more route parameter or vehicle parameter that is determined may include a cant of the route. The one or more route parameter or vehicle parameter that is determined may include a change in a cant of the route. The one or more route parameter or vehicle parameter that is determined may include a wheel defect in a wheel of the vehicle system. Optionally, the wheel defect may be a flat spot in the wheel of the vehicle system. The one or more route parameter or vehicle parameter that is determined may include a wheel diameter of a wheel of the vehicle system. The one or more route parameter or vehicle parameter that is determined may include a relative difference in wheel diameters between wheels coupled with different axles in the vehicle system. The operation of the vehicle system may be changed by changing a torque imparted on an axle of the vehicle system by one or more motors. The operation of the vehicle system may be changed by changing the toque imparted on the axle of the vehicle system by the one or more motors without concurrently changing a torque imparted on another axle of the vehicle system by one or more other motors. Optionally, the operation of the vehicle system may change a tractive effort generated by a motor-axle combination of the vehicle system. By changing the tractive effort generated by the motor-axle combination of the vehicle system without concurrently changing a tractive effort generated by another motor-axle combination of the vehicle system, by changing a wheel creep of a set of wheels coupled with an axle of the vehicle system, by changing the wheel creep of the set of wheels coupled with the axle without concurrently changing a wheel creep of another set of wheels coupled with another axle of the vehicle system, by preventing application of a friction-modifying substance to the route by a wheel adhesion control system disposed onboard the vehicle system, and/or by preventing application of the friction-modifying substance to the route by the wheel adhesion control system while the vehicle system travels over a section of the route associated with the one or more route parameter or vehicle parameter that is determined.

The operation of the vehicle system may be changed for an axle of the vehicle system based on a position of the axle in the vehicle system. The operation of the vehicle system may be changed for a single axle of the vehicle system based on a position of the single axle in the vehicle system relative to one or more other axles of the vehicle system.

The operation of the vehicle system may be changed for several axles in a single bogie of the vehicle system based on a position of the single bogie in the vehicle system. The operation of the vehicle system may be changed for several axles in a single bogie of the vehicle system based on a position of the single bogie in the vehicle system relative to one or more other bogies of the vehicle system. The operation of the vehicle system that is changed may include raising a wheel of the vehicle system away from the route relative to one or more other wheels of the vehicle system, and/or raising an axle of the vehicle system away from the route relative to one or more other axles of the vehicle system.

In one example of the subject matter described herein, a method for controlling a vehicle system may include determining one or more of a route parameter of a route on which a vehicle system is moving or a vehicle parameter of the vehicle system, and determining the one or more route parameter of the vehicle parameter may include determining that the vehicle system is moving toward a curved section of the route. The method may also include determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route may be reduced to a value less than the designated threshold by changing an operation of the vehicle system.

In one example of the subject matter described herein, a vehicle system may include a chassis and at least two wheel-axle sets attached to the chassis. Each wheel-axle set including an axle, two wheels, and a traction motor. The traction motor of each of the wheel-axle sets may be operably coupled to the corresponding axle. Each traction motor may be provided with designated electrical power to provide separate tractive effort to move the corresponding axle and the two wheels. The vehicle system may also include an electric drive system coupled to the chassis and electrically coupled to each of the traction motors of the wheel-axle sets. The electric drive system may have circuitry for generating the designated electrical power responsive to control input signals. The vehicle system may also include a friction modification system coupled to the chassis. The friction modification system may controllably apply a friction-modifying substance to plural rail-wheel interfaces ahead of the wheels in a direction of travel of the vehicle system. The vehicle system may also include a control system having one or more processors. The control system may be coupled to the chassis, and may be electrically coupled to each of the traction motors of the wheel-axle sets and the friction modification system. The control system may control the friction modification system for application of the friction-modifying substance to the plural rail-wheel interfaces. The control system may generate the control input signals for controlling the electric drive system to power each of the traction motors with the separate tractive effort. The control system may determine a route parameter of a route on which the vehicle system is moving and a vehicle parameter of the vehicle system, and may determine whether ratios of lateral forces exerted by the wheels of the vehicle system on the route to vertical forces exerted by the wheels of the vehicle system on the route increase to values exceeding a designated threshold as a result of one or more of the route parameter of the vehicle parameter that is determined. The control system may control reduction of the ratios of the lateral forces to the vertical forces exerted by the wheels of the vehicle system on the route to values less than the designated threshold by controlling the friction modification system concurrently with controlling the separate tractive effort of the at least two wheel-axle sets as a function of one or more of wheel diameter or track curve magnitude.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The foregoing description of certain embodiments of the inventive subject matter may be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
    determining whether a ratio of a lateral force exerted by one or more wheels of a vehicle system on a route to a vertical force exerted by one or more wheels of the vehicle system on the route increases to a value that exceeds a designated threshold; and
    reducing the ratio of the lateral force to the vertical force exerted by the one or more wheels of the vehicle system on the route to a value less than the designated threshold by changing an operation of the vehicle system,
    wherein the operation of the vehicle system is changed by one or more of:
        changing a torque imparted on an axle of the vehicle system by one or more motors,
        changing a tractive effort generated by a motor-axle combination of the vehicle system,
        changing a wheel creep of a set of wheels coupled with an axle of the vehicle system, or
        preventing application of a friction-modifying substance to the route by a wheel adhesion control system disposed onboard the vehicle system.

2. The method of claim 1, further comprising determining one or more of a route on which the vehicle system is moving, wherein the route is one of a plurality of possible routes; a route parameter; and, a vehicle parameter of the vehicle system.

3. The method of claim 2, wherein determining whether the ratio of the lateral force exerted by the one or more wheels of the vehicle system on the route to the vertical force exerted by the one or more wheels of the vehicle system on the route increases to the value exceeding the designated threshold is in response to a determination of at least one of the route parameter and the vehicle parameter.

4. The method of claim 2, wherein determining the one or more route parameter or vehicle parameter may include determining that the vehicle system is moving toward or entering a curved section of the route.

5. The method of claim 4, wherein the one or more route parameter or vehicle parameter may include one or more of:
    a radius of curvature of a curved section of the route,
    a cant of the route,
    a change in the cant of the route,
    a wheel defect in a wheel of the vehicle system,
    a wheel diameter of a wheel of the vehicle system, and
    a relative difference in wheel diameters between wheels that are coupled with different axles in the vehicle system.

6. The method of claim 5, wherein the wheel defect is a flat spot in the wheel of the vehicle system.

7. The method of claim 5, wherein the wheel defect is a tread depth of the wheel of the vehicle system.

8. The method of claim 1, wherein the operation of the vehicle system is changed by changing the torque imparted on the axle of the vehicle system by the one or more motors without concurrently changing a torque imparted on another axle of the vehicle system by one or more other motors.

9. The method of claim 1, wherein the operation of the vehicle system is changed by changing the tractive effort generated by the motor-axle combination of the vehicle system without concurrently changing a tractive effort generated by another motor-axle combination of the vehicle system.

10. The method of claim 1, wherein the operation of the vehicle system is changed by changing the wheel creep of the set of wheels coupled with the axle without concurrently changing a wheel creep of another set of wheels coupled with another axle of the vehicle system.

11. The method of claim 1, wherein the operation of the vehicle system is changed by preventing application of the friction-modifying substance to the route by the wheel adhesion control system while the vehicle system travels over a section of the route associated with the one or more route parameter or vehicle parameter that is determined.

12. The method of claim 1, wherein the operation of the vehicle system is changed for one or more of:
  an axle of the vehicle system based on a position of the axle in the vehicle system or
  several axles in a single bogie of the vehicle system based on a position of the single bogie in the vehicle system.

13. The method of claim 1, wherein the operation of the vehicle system that is changed may include raising one or more of a wheel and an axle of the vehicle system away from the route relative to one or more other wheels or other axles of the vehicle system.

14. A vehicle control system comprising:
  a controller having one or more processors configured to determine whether a ratio of a lateral force exerted by one or more wheels of a vehicle system on a route to a vertical force exerted by the one or more wheels of the vehicle system on the route increases to a value exceeding a designated threshold and to reduce the ratio of the lateral force to the vertical force exerted by the one or more wheels of the vehicle system on the route to a value less than the designated threshold by changing an operation of the vehicle system,
  wherein the operation of the vehicle system is changed by one or more of:
    changing a torque imparted on an axle of the vehicle system by one or more motors,
    changing a tractive effort generated by a motor-axle combination of the vehicle system
    changing a wheel creep of a set of wheels coupled with an axle of the vehicle system, or
    preventing application of a friction-modifying substance to the route by a wheel adhesion control system disposed onboard the vehicle system.

15. A method comprising:
  determining one or both of a route parameter of a route on which a vehicle system is moving and a vehicle parameter of the vehicle system; and
  in response to said determining, reducing a ratio of a lateral force exerted by one or more wheels of a vehicle system on the route to a vertical force exerted by the one or more wheels of the vehicle system on the route to a value less than a designated threshold,
  wherein operation of the vehicle system is changed by one or more of:
    changing a torque imparted on an axle of the vehicle system by one or more motors,
    changing a tractive effort generated by a motor-axle combination of the vehicle system,
    changing a wheel creep of a set of wheels coupled with an axle of the vehicle system, or
    preventing application of a friction-modifying substance to the route by a wheel adhesion control system disposed onboard the vehicle system.

16. The method of claim 15, wherein reducing the ratio occurs by changing an operation of the vehicle system.

* * * * *